UNITED STATES PATENT OFFICE.

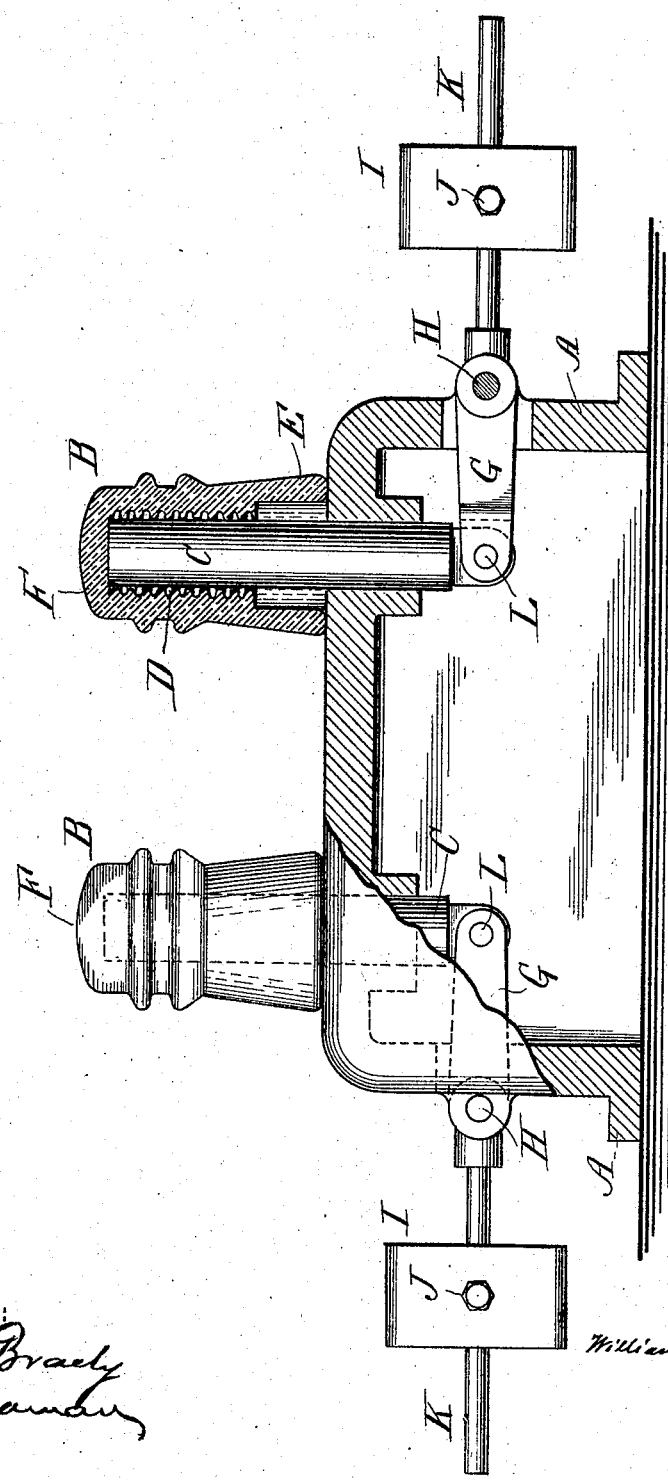

WILLIAM H. SCHORLING, OF BROOKLYN, NEW YORK, ASSIGNOR TO HENRY M. BROOKFIELD, OF ARDSLEY-ON-HUDSON, NEW YORK.

DEVICE FOR SUPPORTING GLASS INSULATORS OR OTHER GLASS ARTICLES WHILE PLASTIC.

No. 815,222.   Specification of Letters Patent.   Patented March 13, 1906.

Application filed June 30, 1903. Renewed January 25, 1906. Serial No. 297,777.

*To all whom it may concern:*

Be it known that I, WILLIAM H. SCHORLING, a citizen of the United States, residing at Brooklyn, in the county of Kings, State of New York, have invented a certain new and useful Device for Supporting Glass Insulators or other Glass Articles while Plastic, of which the following is a specification, reference being had therein to the accompanying drawing.

This invention is an improvement for making glass insulators or other glass articles.

The advantage of the device is as follows: In working fast a great many insulators or other glass articles are taken out of the mold when the glass is in too plastic a condition. When the boy removes the insulator or other glass article from the mold with his fork, it has a tendency to become flattened, and the screw-thread of other interior chamber will not fit the screw or stud or projection to which the insulator or other glass article may be applied. By setting the insulator or other glass article on a pin this is rectified. If the pin is an ordinary fixed pin, there is another difficulty. The glass in the head of the insulator or other glass article is in varying thickness and the insulator or other glass article must of necessity rest on the head in most cases. The glass being soft, it is shoved up into the head, and it is just as bad as if no pins were used at all. The following is a description of my device to overcome this difficulty.

The drawing is an elevation of my machine, shown partly in section.

The pin on the left is shown with a glass insulator set thereon while said article is cooling. At the right the insulator is shown in section.

The reference-letters indicate the parts as follows:

A is a stand or support.
B is an insulator or other glass article.
C is a movable pin.
D is a recess or socket with screw-thread.
E shows the petticoat or lower part of an insulator or other glass article.
F is the head or upper part of an insulator or other glass article.
G is a lever.
H is fulcrum.
I is a balance-weight.
J shows set-screw.
K is long arm of lever.
L is a pivot.

The operation of the device is as follows: A hot insulator or other glass article is taken from the mold and set upon the pin C, the weight I having been previously adjusted to the right or left, according to the size of the insulator or other glass article. For instance, if the insulator or other glass article weighs sixteen ounces, the weight is so placed as to balance fourteen ounces or thereabout upon pin C, whereby the insulator is supported in part at its top and in part at the petticoat. It is obvious that the farther away from the fulcrum H the weight I is moved the more pressure the pin C will exert upon the head F of the insulator or other glass article and the less will be the weight supported by the top of the stand. After the glass has sufficiently cooled the insulator or other glass article is removed and taken to the annealing oven or leer.

I show two pins in the drawing; but I do not confine myself to two pins.

Though I have shown and described but one specific embodiment of my invention in the accompanying drawing and in the foregoing description, I do not limit myself to the precise construction shown, as any device which will cause part of the weight of the insulator to be borne by a pin at least in part movable and part by the base will fulfil all the requirements of and come within the scope of my invention.

I claim as my invention—

1. A support for an insulator or other glass article when in plastic condition comprising a base upon which part of the article may rest and by which part of its weight may be supported, and a pin at least in part movable with relation to said base and projected therefrom in such location as to support a portion of the weight of said article at a part other than that part supported by said base.

2. A movable pin or stud or projection with a weighted lever or equivalent device upon which an insulator or other glass article may be set to cool off.

3. A movable pin or stud or projection with a lever or equivalent device upon which an insulator or other glass article may be set to cool off.

In testimony whereof I have signed my name to this specification in the presence of two subscribing witnesses.

WILLIAM H. SCHORLING.

Witnesses:
 ROBT. E. BRADY,
 EDGAR J. SEAMAN.